United States Patent [19]

Sherif

[11] 4,126,578
[45] Nov. 21, 1978

[54] SULFURIC ACID CATALYST CONTAINING VANADIUM AND PROCESS THEREFOR

[75] Inventor: Fawzy G. Sherif, Stony Point, N.Y.

[73] Assignee: Stauffer Chemical Company, Westport, Conn.

[21] Appl. No.: 816,238

[22] Filed: Jul. 18, 1977

[51] Int. Cl.$^2$ .................. B01J 27/02; B01J 31/02; B01J 31/12; C01B 17/78
[52] U.S. Cl. .................. 252/440; 252/430; 252/431 C; 252/439; 423/535; 423/538
[58] Field of Search .................. 252/431 C, 440, 430, 252/439, 535; 423/538

[56] References Cited

U.S. PATENT DOCUMENTS

| Re. 18,380 | 3/1932 | Jaeger | 252/454 |
|---|---|---|---|
| Re. 19,282 | 8/1934 | Slama et al. | 23/175 |
| 1,862,825 | 6/1932 | Laury | 423/538 |
| 2,941,957 | 6/1960 | Pinchbeck et al. | 252/440 |
| 3,018,255 | 1/1962 | Banks | 252/455 R |
| 3,215,644 | 11/1965 | Kakinoki et al. | 252/440 |
| 3,448,061 | 6/1969 | Mika | 252/456 |

*Primary Examiner*—Delbert E. Gantz
*Assistant Examiner*—William G. Wright
*Attorney, Agent, or Firm*—William R. Robinson

[57] ABSTRACT

A sulfuric acid catalyst is made by wetting a silica carrier having an alumina content between about 2.5 and about 5.0 percent by weight with an aqueous solution of potassium vanadate and a potassium salt of an acid having a $pK_a$ between about 3 and about 7, drying the wet carrier and then sulfating the carrier.

9 Claims, 1 Drawing Figure

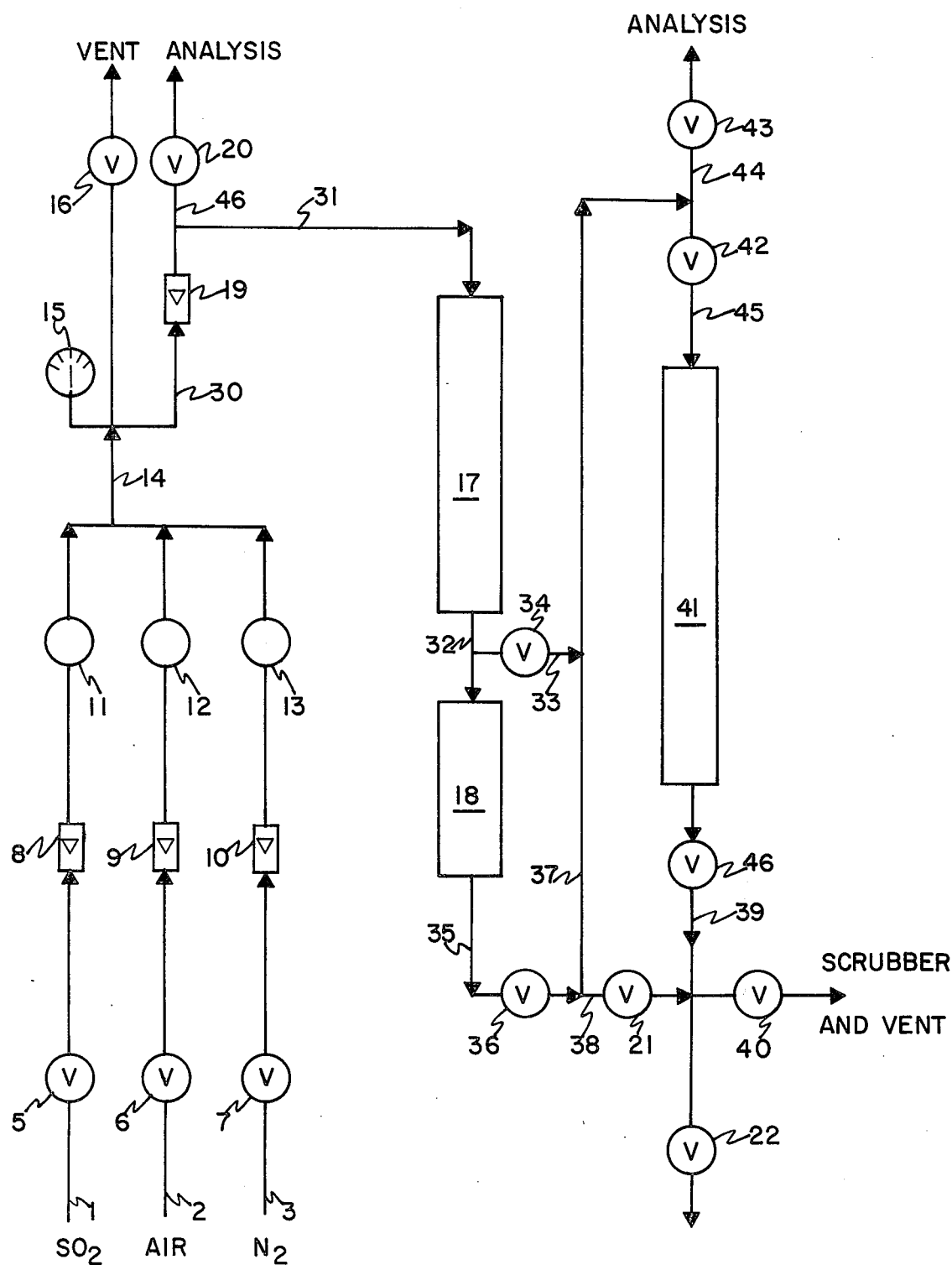

SULFURIC ACID CATALYST CONTAINING VANADIUM AND PROCESS THEREFOR

BACKGROUND OF THE INVENTION

This invention relates to a catalyst for the oxidation of sulfur dioxide to sulfur trioxide.

Sulfuric acid is generally prepared on a commercial scale by the gas phase oxidation of sulfur dioxide to sulfur trioxide followed by absorption of the sulfur trioxide in an aqueous medium. Various catalysts for the oxidation of the sulfur dioxide to sulfur trioxide have been described in the prior art.

For example, U.S. Pat. No. Re. 18,380 discloses the use of non-silicious base exchange contact masses containing vanadium as catalysts for this process. U.S. Pat. No. 1,862,825 describes the preparation of a catalyst by spraying calcined natural diatomaceous earth aggregates with a solution of sodium vanadate and drying, preferably in an atmosphere of sulfur dioxide.

Another sulfuric acid catalyst is disclosed in U.S. Pat. No. 3,448,061 wherein a solution prepared by dissolving vanadium pentoxide in sodium or potassium hydroxide solution is mixed with an alkali metal salt of a strong acid, such as potassium sulfate, and the resulting mixture circulated through a preshaped, porous carrier which is subsequently dried to form a catalyst. The process involved the use of excess alkali under controlled pH so as to minimize deformations and breaking of the catalyst carrier on drying or at the working temperature.

In U.S. Pat. No. Re. 19,282, the addition to a very finely divided carrier of potassium or sodium hydrate, carbonate, sulfate, or nitrate together with a vanadium compound is disclosed.

While various vanadium contact catalysts are presently used in commercial operations, they are subject to several disadvantages in their preparation and their use. For example, it is generally recognized that stoichiometric amounts of alkali metal are required in order to confer the desired activity on the catalyst. However, the use of excess amounts of potassium hydroxide causes vanadium to precipitate, thus requiring the addition of ammonia to solubilize the precipitated metal. The use of compounds such as potassium sulfate, as described in the aforementioned '061 patent, require multiple impregnation steps in order to add sufficient vanadium and alkali to the support. Furthermore, while the prior art catalysts may be active or durable, there is still a need for a sulfuric acid catalyst which is both durable and very active.

Now it has been found in accordance with this invention that sulfuric acid catalysts having high activity and durability can be readily made by a one-step process.

SUMMARY OF THE INVENTION

The sulfuric acid catalysts of this invention are made by wetting a silica carrier having an alumina content between about 2.5 and about 5.0 percent by weight, with an aqueous solution of potassium vanadate and a potassium salt of an acid having a $pK_a$ between about 3 and 7, drying and then sulfating the carrier.

BRIEF DESCRIPTION OF THE INVENTION

The FIGURE is a diagrammatic drawing of the apparatus for determining catalyst activity.

DETAILED DESCRIPTION OF THE INVENTION

More in detail, the process of this invention employs as a carrier a silica material having an alumina content between about 2.5 and about 5.0 percent by weight. The silica materials are derived from various natural sources and can be leached if necessary to remove excess alumina. The silica can be in particulate form, the support being shaped after impregnation, or it can be in the form of preshaped particles. The support is shaped into any desired configuration using such means as tableting presses, briquetting mills, pellet mills and the like. Preferably, preformed spherical particles having an average diameter of ⅛ inch to ¼ inch are employed.

The mixture employed to wet the silica carrier contains both potassium vanadate and a potassium salt of an acid having a $pK_a$ between about 3 and about 7. The potassium vanadate is conveniently obtained by suspending ammonium vanadate in water, adding aqueous potassium hydroxide and heating to drive off ammonia vapors. Alternately, any method for preparing potassium vanadate can be employed.

The resulting potassium vanadate solution is then mixed with an aqueous solution of a potassium salt of an acid having a $pK_a$ between about 3 and about 7. Illustrative are the potassium salts of formic acid, citric acid, acetic acid, tartaric acid, oxalic acid and sulfurous acid.

The components of the solution are added in amounts to provide between about 2.7 and about 3.1 moles of potassium per mole of vanadium. Generally, stoichiometric amounts of ammonium vanadate and potassium hydroxide are employed in preparing the potassium vanadate solution. Thus, at least 1.7 additional moles of potassium are required, and this calculation is employed to determine the amount of the potassium salt of the acid that must be employed.

It is another advantage of this invention that an effective catalyst can be prepared containing as little as 4.0 weight percent $V_2O_5$. Inasmuch as vanadium is the most expensive constituent of a sulfuric acid catalyst, this advantage provides a favorable comparison with commercial catalysts which generally employ 8.0 weight percent and more of $V_2O_5$. Preferably, from about 5.0 to about 7.0 percent by weight $V_2O_5$ is employed in this invention. The vanadium content of the catalyst is expressed as % $V_2O_5$, in accordance with the practice in this art.

It is preferred in the practice of this invention to impregnate the silica support in one step. Advantageously, this can be achieved by first mixing a sample of the support with water and ascertaining the amount of water the sample will hold per unit weight. Then, an amount of the impregnating mixture of this invention corresponding to this amount is added to the support. The addition can take place in any suitable container, but it is preferred to employ a tumbling action in order to insure uniform impregnation.

Where particles are employed, after the impregnation step, additional water, if necessary, may be added to provide a consistency suitable for agglomerating the particles. The particles can be conveniently agglomerated by tableting, pelletising, etc. Where a preshaped support is used, the impregnated support is ready for the next step where drying is carried out.

The impregnated support is dried at temperatures between about 100° C. and about 250° C. Preferably, temperatures of about 120° C. to about 160° C. are employed. Since the purpose of this drying step is to remove the water utilized in the impregnating solution, it should be appreciated that temperatures high enough to dry the support without acting detrimentally on its characteristics are preferable.

The dried support is then sulfated, preferably by contacting it with an oxygen containing gas-stream containing small amounts of from about 2 to about 6 percent by weight of sulfur dioxide mixed with from about 1 to about 3 percent by weight of sulfur trioxide. A temperature in the range of about 100° C. to about 550° C. is employed in this step. Reaction with the dilute sulfur dioxide containing gas-stream activates the catalyst particles which are then suitable for use as a catalyst in the sulfur dioxide oxidation process.

Another advantage of the catalyst of this invention is that calcination is unnecessary. Thus, many sulfuric acid catalysts require heating at temperatures from about 400° C. to about 600° C. for extended periods of time in order to remove trace moisture and to strengthen the particles through interaction of active ingredients prior to the sulfation step. However, active and durable catalysts are provided in accordance with this invention without this costly and time consuming step.

The activity of the catalysts shown in the examples was determined by measuring the conversions obtained by passing a gas stream containing sulfur dioxide, sulfur trioxide, oxygen and nitrogen over the catalysts at a controlled rate and temperature.

The activity of the catalyst was determined by measuring the amount of sulfur dioxide converted to sulfur trioxide in a partially reacted sulfur dioxide containing gas stream. A gas stream containing sulfur dioxide, oxygen and nitrogen is first passed over a sulfur dioxide oxidation catalyst to convert from about 90 to about 97% of the sulfur dioxide to sulfur trioxide. The sulfur dioxide content of the partially converted gas stream is passed over the catalyst to be tested. The catalyst being tested is maintained at a controlled temperature and the flow rate of sulfur dioxide containing gas contacting the catalyst is carefully controlled. The sulfur dioxide content of the gas stream before and after contact with the catalyst being tested is measured. An activity coefficient for the particular catalyst is determined from the concentration of oxygen, sulfur dioxide and sulfur trioxide in the gas stream entering the test reactor and the concentration of oxygen, sulfur dioxide and sulfur trioxide in the gas stream leaving the test reactor at the temperature of testing. The apparatus for catalyst testing is shown in the Figure.

Cylinders of dry sulfur dioxide, air and nitrogen properly pressure-reduced are connected to lines 1, 2 and 3, respectively. The systems for metering the three gases are the same. The gases at a pressure of about 10 pounds per square inch gauge (psig) enter the system and pass through shut-off valves 5, 6 and 7 in the sulfur dioxide, air and nitrogen lines. The gases are metered at a pressure of about 10 psig through rotameters 8, 9 and 10 and low flow control means 11, 12 and 13. The gases are mixed in line 14 at a pressure between 1 and 2 psig. The pressure in line 14 is monitored by pressure gauge 15. Vent valve 16 in line 14 permits the mixture of gases to be passed to the vent until the required mixture of gases is obtained. The total flow of mixed gases passing through line 30 is measured by rotameter 19. The mixed gas stream is passed through line 31 to reactor 71. A sample can be taken through line 46 and valve 20 to determine the concentration of sulfur dioxide in the gas stream.

Reactors 17 and 18 are electrically heated reactors and contain a sulfur dioxide oxidation catalyst. Reactors 17 and 18 are utilized to convert a portion of the sulfur dioxide in the gas stream to sulfur trioxide. One or two reactors are utilized depending upon the amount of preconversion desired for a particular run. The preconverted gas leaving reactor 17 passes through line 32 and can pass through line 33 and valve 34 to line 37 and directly to test reactor 41 through valve 42 and line 45. If additional preconversion is required the partially converted gas stream can be passed through reactor 18, line 35 and valve 36 to line 37 which passes the preconverted gas to test reactor 41.

A sample of the preconverted gas in line 37 is removed from the system through line 44 and valve 43 for analysis. The preconverted gas stream is passed through valve 42 and line 45 to test reactor 41.

Test reactor 41 is immersed in a heated fluidized sand bath which is controlled to maintain the proper temperature in the reactor. The test reactor 41 has a 1 inch inside diameter. Fifty cubic centimeters of catalyst is introduced into the reactor for testing. The effluent from the test reactor is passed through valve 46 in line 39 and passed through valve 40 to the scrubber and the vent. A sample for analysis can be taken from the system through valve 22.

Reactor 41 can be by-passed by passing the preconverted gas through line 38 and valve 21 to line 39.

During testing of a catalyst the sulfur dioxide concentration in the gas stream entering the test reactor through line 45 and leaving the reactor through line 39 are monitored. The gas mixture entering reactors 17 and 18 through line 31 is adjusted to contain about 9.5% $SO_2$, about 11.4% $O_2$ and the balance, nitrogen. The catalyst being tested is equilibrated by passing the preconverted gas stream over the catalyst at the test temperature for 2 hours before sampling the gas stream. The sulfur dioxide concentration in the preconverted gas stream and in the gas stream after contact with the catalyst being tested is determined by iodometric titration.

The amount of sulfur dioxide and oxygen in the gas stream entering and leaving the test reactor is measured. The rate constant $k$, was computed from the data using the following rate expression.

$$\text{rate} = k(P_{SO_2}/P_{SO_3})^{0.5} \cdot P_{O_2} [1-(P_{SO_3}/P_{O_2}^{0.5} P_{SO_2} \text{keq})^{0.5}]$$

where
keq = equilibrium constant
log keq = $5186.5/T_A + 0.611 \log T_A - 6.7497$
$T_A$ = temperature, °K.
$P_{SO_2}$ = Partial pressure of $SO_2$ in atmospheres.
$P_{SO_3}$ = Partial pressure of $SO_3$ in atmospheres formed by contact with the catalyst being tested.
$P_{O_2}$ = Partial pressure of $O_2$ in atmospheres.

$$\text{The rate constant } k = \frac{\text{g moles } SO_2 \text{ converted}}{\text{atoms} \times \text{second} \times \text{gram catalyst}}$$

The rate constant $k_v$ reported herein $=k \times$ bulk density of sulfated catalyst in grams per cubic centimeter.

The durability of the catalyst (Accelerated Abrasion Loss) is measured by heating 150 grams of the fresh catalyst pellets at 816° C. for 24 hours. The catalyst pellets are then contacted with a gas mixture containing about 4.0% $SO_2$ and about 5.0% $SO_3$ for 2 hours at 432° C. A 100 gram sample of the heated and reacted catalyst is shaken over a standard 20 mesh sieve, U.S. Sieve Series, for 1 hour using a Rotap shaker. The loss in weight after shaking for 1 hour indicates the durability of the catalyst. The durability of the catalyst is indicated as the percent loss through the 20 mesh screen. The lower numbers indicate a more durable catalyst. The Accelerated Abrasion Loss test has been found to correlate closely with durability experienced with sulfur dioxide oxidation catalysts under commercial process operating conditions.

The invention will be more fully illustrated by reference to the following examples.

EXAMPLE 1

A suspension of 33.9 grams (gms) of ammonium vanadate in 50 milliliters (mls) of water was mixed with a solution of 16.2 grams potassium hydroxide and 50 mls. of water and boiled until the evolution of ammonia vapors ceased. The resulting potassium vanadate solution was mixed with a solution of potassium oxalate made by dissolving 50.4 gms. $K_2C_2O_4 \cdot H_2O$ in 75 mls. water, and the volume of the resulting mixture was adjusted to 225 mls. at a temperature of 80° C. The amount of 300 gms. of 3/16 inch diameter silica spheres containing 3% by weight $Al_2O_3$, were tumbled in a round bottom flask in a rotary motion. The heated potassium vanadate — potassium oxalate mixture was added dropwise to the spheres while maintaining a temperature of 80° C. by an external electrical heater. The process of impregnation lasted 60 minutes. The impregnated spheres were dried in an oven at 140° C. for eight hours, and then sulfated by exposure to a gas containing about 4% $SO_2$ and 5% $SO_3$ for 4 hours at 205° C. The spheres were calculated to contain 5.5% by weight $V_2O_5$. The rate constant and accelerated abrasion loss (AAL) values were determined according to the method disclosed above; the results are set forth in the Table below.

EXAMPLES 2 – 5

Four different catalysts were made employing the ingredients, quantities and method of Example 1 except the temperatures of sulfation were 140°, 315°, 432° and 538° C. respectively. The rate constant and Accelerated Abrasion Loss values are set forth in the Table.

EXAMPLE 6

A catalyst was prepared according to the method of Example 1 and employing the same ingredients and quantities except that 43.3 gms. of potassium sulfite were used in place of the potassium oxalate. The catalyst was dried at 538° C. and sulfated at 432° C. The results of the evaluation tests are set forth in the Table.

EXAMPLE 7

A catalyst was prepared according to Example 1 except that the support was pellets made of a powder clay having a surface area of 325 square meters per gram, a silica content of 80% by weight and $Al_2O_3$ content of 8.7% by weight. The clay was treated with concentrated sulfuric acid to provide a residual alumina content of 4.2% by weight. Then 7/32 inch diameter pellets were made and impregnated according to Example 1. The test results are set forth in the Table.

EXAMPLE 8

A catalyst was prepared employing the ingredients and quantities and following the method of Example 1, except that the impregnated support was dried at 538° C. for 4 hours and then sulfated at 432° C. The results set forth in the Table indicate that the higher drying and sulfating temperatures resulted in increased durability and decreased activity for this particular system.

EXAMPLE 9

A catalyst was made according to Example 1 except that the support comprised 7/32 inch diameter pellets made from an activated clay powder having a surface area of 285 square meters per gram, a silica content of 72% by weight and an $Al_2O_3$ content of 17% by weight. Prior to making the pellets, the clay was treated with concentrated sulfuric acid to leach out the $Al_2O_3$ in the clay, leaving a residual alumina content of 4.76% by weight. The results of the evaluation tests on the impregnated catalyst are set forth in the Table.

EXAMPLE 10

A catalyst was prepared according to Example 1 except that the support was pellets made from diatomaceous earth powder having a surface area of 20–30 square meters per gram and an $Al_2O_3$ content of 3.5% by weight. The pellets were calcined at 538° C. before impregnation. The test results are set forth in the Table.

COMPARATIVE EXAMPLE 1

A catalyst was made employing the ingredients, quantities and method of Example 1 except that 47.7 gms. of potassium sulfate were used instead of potassium oxalate. Because of the limited solubility of the potassium sulfate in water, the volume of this solution was 225 ml. and the volume of the final potassium vanadate-potassium sulfate mixture was adjusted to 400 ml. Because this volume exceeded the pore volume of the support, impregnation had to be carried out in two steps with a drying step in between. The double impregnated catalyst was dried at 538° C. and sulfated at 432° C. The results set forth in the Table indicate no improvement for a double impregnation.

COMPARATIVE EXAMPLE 2

A catalyst was prepared according to Example 1, but employing the salts in concentrations to provide a final $V_2O_5$ content in the catalyst of 8% by weight, and employing potassium sulfate instead of the oxalate. Thus, 33.8 gms. of ammonium vanadate in 50 mls. water were boiled with a solution of 16.2 gms. of potassium hydroxide in 50 mls. water until the evolution of ammonia vapors ceased. To the solution 47.7 gms. of potassium sulfate dissolved in 225 ml. water was added and the mixture was used to impregnate 200 gms. of the spherical support in two impregnation steps. The catalyst was dried at 140° C. and sulfated at 432° C.; the test results are set forth in the Table.

This example demonstrates the advantage as shown in Example 1, of using 5.5% $V_2O_5$ on this support instead of using the 8% $V_2O_5$ concentration present in most commercial catalysts. It also shows the advantage of a single impregnation step in Example 1 over the double impregnation step in this example.

COMPARATIVE EXAMPLE 3

A catalyst was made according to Example 1 except that 37.8 gms. of potassium carbonate were used instead of potassium oxalate. The catalyst was dried at 538° C. and sulfated at 432° C. The test results, as reported in the Table, reflect the low activity obtained with potassium carbonate.

COMPARATIVE EXAMPLE 4

For further purposes of comparison, a commercial catalyst was evaluated and the results are set forth in the Table. The catalyst was Vanadium Catalyst G-101, available from Girdler Chemical, Inc., Louisville, Kentucky. It consisted of a silica carrier impregnated with potassium and vanadium salts to provide a $KVO_3$-$K_2O$ molten salt mixture as the active catalytic component. The test results, reported in the Table, reflect the high abrasion loss obtained with this product.

COMPARATIVE EXAMPLE 5

A catalyst was prepared according to Example 1 except that the support was diatomaceous earth pellets containing 9% by weight alumina. Testing revealed poor activity with this high alumina content support; the result is reported in the Table.

COMPARATIVE EXAMPLE 6

Again the procedure of Example 1 was repeated with the exception that the support was Mobil Durabead spheres containing 10% alumina. Poor activity resulted when the catalyst was tested; the value is set forth in the Table.

COMPARATIVE EXAMPLE 7

In this example, the procedure of Example 1 was repeated employing PPG glass beads available from PPG Industries, Inc., Pittsburgh, Penn. These are uniform, spherical 5 millimeter diameter beads having a surface area of 250 square meters per gram and a pore volume of 0.65 cubic centimeters per gram. The beads are reported to contain no alumina. As reported in the Table, the catalyst has poor activity.

TABLE

| EXAMPLE | ACTIVITY CONSTANT $k_v \times 10^7$, 432° C. | ACCELERATED ABRASION LOSS, PERCENT |
|---|---|---|
| 1 | 214±18 | 5.1 |
| 2 | 183±18 | 0 |
| 3 | 187±29 | — |
| 4 | 167±4 | 0.7 |
| 5 | 127±12 | — |
| 6 | 165±12 | 0.8 |
| 7 | 163±4 | 2.0 |
| 8 | 115±8 | 2.7 |
| 9 | 153±7 | 3.7 |
| 10 | 144±18 | 1.7 |
| C-1 | 160±10 | 0.8 |
| C-2 | 123±3 | 3.1 |
| C-3 | 38±11 | — |
| C-4 | 157±14 | 10.5 |
| C-5 | 76 | — |
| C-6 | 24±4 | — |
| C-7 | 92±6 | — |

What is claimed is:

1. A process for preparing a catalyst for the oxidation of sulfur dioxide to sulfur trioxide which comprises wetting a silica carrier having an alumina content between about 2.5 and about 5.0 percent by weight with an aqueous solution of potassium vanadate and a potassium salt of an acid having a $pK_a$ between about 3 and about 7, drying the wet carrier and then sulfating the carrier.

2. The process of claim 1 wherein said potassium salt is potassium formate, potassium citrate, potassium acetate, potassium tartarate, potassium oxalate or potassium sulfite.

3. The process of claim 2 wherein said silica carrier is a preshaped support.

4. The process of claim 3 wherein said preshaped support is impregnated with said aqueous solution.

5. The process of claim 1 wherein said aqueous solution contains between about 2.7 to about 3.1 moles of potassium per mole of vanadium.

6. The process of claim 1 wherein said potassium vanadate is employed in an amount to provide from about 5.0 to about 7.0 percent by weight $V_2O_5$ in said catalyst.

7. The process of claim 1 wherein said potassium salt is potassium oxalate and said silica carrier is a preshaped support.

8. The process of claim 1 wherein said potassium salt is potassium sulfite and said silica carrier is a preshaped support.

9. The catalyst prepared by the process of claim 1.

* * * * *

UNITED STATES PATENT AND TRADEMARK OFFICE
CERTIFICATE OF CORRECTION

PATENT NO. : 4,126,578
DATED : November 21, 1978
INVENTOR(S) : Fawzy G. Sherif

It is certified that error appears in the above-identified patent and that said Letters Patent are hereby corrected as shown below:

Column 3, line 67, "71" should be "17".

Column 8, line 4, "107" should be "$10^7$".

Signed and Sealed this

Third Day of April 1979

[SEAL]

Attest:

RUTH C. MASON
Attesting Officer

DONALD W. BANNER
Commissioner of Patents and Trademarks